Patented Apr. 27, 1926.

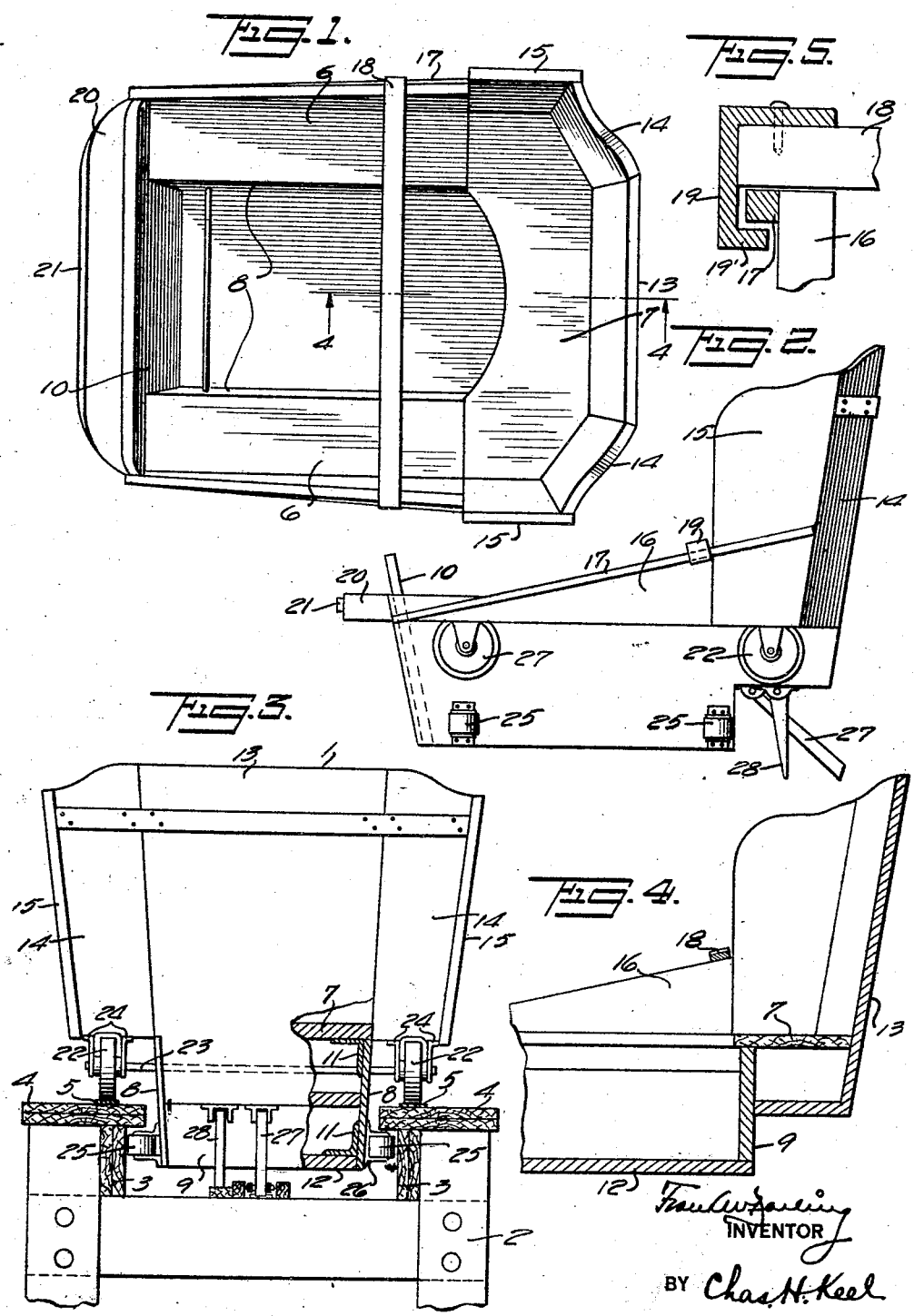

1,582,581

UNITED STATES PATENT OFFICE.

FRANK W. DARLING, OF NEW YORK, N. Y., ASSIGNOR TO THE L. A. THOMPSON SCENIC RAILWAY COMPANY, OF NEW YORK, N. Y., A CORPORATION OF NEW JERSEY.

COASTER CAR FOR PLEASURE COASTERS.

Application filed July 10, 1925. Serial No. 42,641.

*To all whom it may concern:*

Be it known that I, FRANK W. DARLING, a citizen of the United States, residing at one fifty-five East Forty-ninth Street, New York, in the county and State of New York, have invented a new Coaster Car for Pleasure Coasters, of which the following is a specification.

This invention relates to passenger coaster cars for artificial pleasure coaster ways.

The car of this application is particularly adapted for use with the children's coaster set forth in application Serial No. 79,983, filed January 8, 1926, although certain novel features thereof are capable of more general application.

The object of the invention generally is a passenger car for the above indicated purposes which is peculiarly characterized by its safety and reliability in operation and by the accuracy with which its performance may be predetermined. To this end the car is so constructed and its parts so proportioned and correlated together as to secure inherent stability and equilibrium under the most severe service operating conditions for which the coaster is constructed, thereby avoiding the necessity for special anti-tipping or retaining devices and eliminating the uncertain frictional resistances thereof. More specifically the car construction and arrangement are such that the center of weight or gravity of the loaded car is approximately opposite the axis of traction whereby the traction is facilitated, the safety of the car enhanced by minimizing the possibility of the cars tipping off the coaster structure, and the necessity for anti-tipping wheels or guards with their uncertain frictional resistances is avoided, and especially a car of this general character characterized by its rigidity and ruggedness in construction and by its ability to withstand severe service conditions to which equipment of this character is subjected.

A further object of the invention is a car, of the above indicated character, which is of simple construction and operation and may be economically constructed and assembled on the coaster way, with a minimum of skilled labor and safely operated with a minimum of attention and inspection.

For a better understanding of the invention, reference may be had to the accompanying drawings forming a part of this application, wherein:

Fig. 1 is a plan view of a car according to this invention,

Fig. 2 is a side elevation thereof,

Fig. 3 is a rear end view partly broken away and in section, shown mounted on the coaster way, Fig. 4 is a sectional view along the line 4—4 of Fig. 1, and Fig. 5 is a detailed sectional view of parts 17—19 in Figs. 1 and 2.

Referring to the drawings, I have indicated my invention as embodied in a coaster car 1 which is adapted to be mounted upon and traverse a coaster track including a track foundation 2, the side guard rails 3, and the traction rails 4, the latter overhanging (in an inward direction) the guard rails and carrying suitable metallic tracks 5 on which the weight of the car bears in its travel along the coaster way.

The car frame includes a pair of main side rails 6 which are bridged by a rear bridging member 7. The bridging member 7 forms a seat for the passengers and the space between the side rails 6 forms an opening for the accommodation of the passengers' feet. A downwardly extending compartment for the accommodation of the passengers' feet is suspended from the under side of the side rails or panels 6 and cross-piece 7 and this compartment is in the form of a box structure including the side members 8, the rear end member 9, the front or footboard member 10 and the floor member 12. These parts of the downwardly extending compartment are attached together and to the main frame members 6 and 7 by means of angle-irons 11, the latter also serving to reinforce the corners of the structure and otherwise screwed and bolted together. It is observed that the floor box structure is slightly inwardly tapered in a downward direction and extends a substantial distance below the traction rails 4 and 5. Surrounding the rear end of the car is an open top housing including the upwardly extending panels 13, 14 and 15. These panels being outwardly inclined in an upward direction form back and side rests for the passengers disposed on the seats 7. These members 13, 14 and 15 may be secured to the main frame members 6 and seat 7 in any suitable manner, the particular manner of attachment being unimportant. A pair of side boards 16 of tapered form are attached to the outer edges of the main frame panels 6, with their wide ends abutting against the side panels 15 and their forward ends projecting slightly beyond the foot board 10. Each of the side boards 16 carries on its upper outer edge a guide rail 17 for guiding the lap board or rail 18. The latter carries at each end a U shaped angle iron 19 having its lower leg projecting underneath the guide rail 17 for retaining the board in position. The lap board slides rearwardly and forwardly upon the upper edges of the side board 16 and forms a grip for the children or other passengers while in operation, and prevents their raising from the seat while the car is in motion. To the front end of the car is fastened the bumper 20 with the rubber buffer 21 thereon, this bumper being in line with the side panels 6.

The traction wheels for the car consist of the two pairs of flangeless wheels 22 which are carried respectively at the front and rear of the car and are mounted directly on the main side rails 6 and seat 7. These wheels are journaled on stationary shafts 23 which pass transversely through the side box members 8 and are supported at their outer ends by suitable brackets 24, the latter being secured in any suitable manner to the under side of the side rails 6 and the cross member 7. The box or compartment structure for the passengers which extends downwardly beneath the side rails 6 and the seat 7 extends downwardly past and beyond the rails 4 and 5 into the coaster chute. The floor member 12 of the box being so low with reference to the axis of traction, and the seat 7 being approximately in line with or slightly above the axis of traction, and the floor carrying large part of the riders' weight below the axis of traction, there is no tendency for the car to tip over under ordinary conditions of service, the center of weight or gravity of the loaded car being approximately opposite the axis of traction, it being observed that the distance of the floor 12 below the axis 23 of the traction wheels is more than twice the distance of the seat 7 thereabove. The traction wheels 22 do not have retaining flanges, and I have illustrated two pairs of guard or buffer wheels 25 which are mounted at the front and rear on the side of the car compartment and are carried by suitable brackets 26. These rollers 25 are attached adjacent the lower edges of the side members 8 just above or about on a level with the floor 12 and are normally out of contact with the guard side rails 3, usually functioning only in going around curves to cause the car to follow the curved track 4 and 5. Also as a precaution and emergency safety arrangement the track rails 4 overhang the carrying brackets 26 and thereby prevent the accidental jumping of the car from the coaster track in emergencies.

With the construction of car illustrated wherein the passenger compartment including the floor 12 is disposed in the lowest practical position within the chute between the coaster tracks, and the traction wheels are fixed in the highest practical position, namely approximately on a level with the main frame members 6 and seat 7, perfect stability of the car in operation is secured and the necessity for anti-tipping friction devices is eliminated, aside from facilitating the traction itself. For example, the only friction devices on the car are the traction wheels 22 (together with the rollers or guard wheels 25, while going around curves) and accordingly the calculation of the desired curves and gradients is thereby facilitated and rendered more certain and reliable. Preferably the wheels should be journaled on ball bearings to minimize friction, especially when the car is of the light weight indicated and is to be operated at the comparatively slow speed intended. Moreover the arrangement of the guard wheels 25 slightly above the floor board 12 and the location of the seat 7 only slightly above the axis of traction, also contribute to the practicability of a coaster car for the purpose set forth. With a car constructed in this manner and mounted upon an artificial coaster way of the character herein generally illustrated and set forth in detail in the above mentioned application, all the sensations of hill coasting may be experienced by children or other passengers using the car, but with entire safety in every particular at all times. Moreover the car herein illustrated may be economically manufactured, and is rugged and durable in service, necessitating a minimum of repairs.

The car has demonstrated in actual practice its stability, utility and durability under the most severe service conditions for which it is constructed, and notwithstanding its lightness in weight. For example I have found that a coaster car of this construction and of not more than 150 pounds loaded weight, can be successfully and safely operated on the particular coaster indicated indefinitely.

At 27 and 28 I have indicated safety catch and stop members to arrest the rearward movement of a car in the event that it should stop on an up grade, these members 27 and 28 cooperating with suitable devices disposed at the bottom of the chute between the rails for effecting this purpose.

Having thus described my invention, what I claim and desire to protect by Letters Patent is:

1. A passenger coaster car for pleasure coasters including a main base frame, one member of which forms the seat for the passenger compartment, a pair of traction wheels disposed underneath said seat member and journaled in brackets which are attached directly to the underside thereof with the peripheries of the wheels just clearing said seat member, a forward pair of traction wheels disposed underneath other members of the main base frame, a downward extension of the passenger compartment disposed intermediate the traction wheels and having the greater portion thereof disposed below the axis of traction of said wheels whereby the center of gravity of the loaded car is approximately opposite the traction axis, and an upwardly extending enclosing casing surrounding the rear and sides of said seat member.

2. A passenger coaster car for pleasure coasters including a main base frame, one member of which forms the seat for the passenger compartment, a pair of traction wheels disposed underneath said seat member and journaled in brackets which are attached directly to the underside thereof with the peripheries of the wheels just clearing said seat member, a forward pair of traction wheels disposed underneath other members of the main base frame, a downward extension of the passenger compartment disposed intermediate the traction wheels and having the greater portion thereof disposed below the axis of traction of said wheels whereby the center of gravity of the loaded car is approximately opposite the traction axis, an upwardly extending side enclosing casing surrounding the rear and sides of said seat member, and guard wheels and brackets attached to the sides of the passenger compartment extension for guiding the car on a straight course, said guard wheels and brackets being disposed below the traction level of the traction wheels to permit the protrusion of overhanging traction rails above the brackets.

3. In a passenger coaster car for coaster railways, a main base frame including a rear member which forms the seat of the car and a pair of oppositely disposed and forwardly extending side members, a pair of traction wheels disposed directly underneath and carried directly by the seat member, a pair of forward traction wheels carried underneath and directly by the side frame members, upwardly extending back and side rest members attached to the rear and sides of said main frame member, a box-like structure forming a lower extension of the passenger compartment and attached to the lower side of said main base frame, and means securing together and forming a rigid structure of the main base frame, the back and side rests and the box-like structure.

4. In a passenger coaster car for children's pleasure coasters, a main body frame including a rearwardly disposed transverse seat member and a pair of forwardly extending side members approximately on a level with the seat member, forward and rearward traction wheel brackets attached directly to and underneath the main body frame near the opposite edges thereof with traction wheels mounted therein which just clear the seat and side members of the main body, an upwardly extending housing including back and side rest members carried near the outer edges of the main body frame, the side members thereof being of decreasing depth in the forward direction, a downwardly projecting extension of the passenger compartment projecting down below and between the traction wheels and side rails, and brackets carried by said compartment extension down below the level of the traction wheels to permit the protrusion therebetween of overhanging traction wheels.

5. In a passenger coaster car for pleasure coasters, a main body frame including a pair of side members and a rear seat member extending transversely thereacross, traction wheels mounted on the under side of the said main body frame and near the outer side edges thereof, a passenger compartment extension of lateral dimensions less than the length of said seat member, said extension projecting down between the traction wheels and to a substantial distance below thereof, whereby the loaded weight is substantially below the axial center of the wheels, and a housing around the rear and sides of said seat member, together with means for securing together and forming a rigid structure of the main body frame, the back and side rest housing and the downwardly projecting compartment extension.

6. A passenger coaster car for children's pleasure coasters including a main body with flangeless traction wheels adapted to traverse suitable traction rails, a seat disposed near the traction axis of the vehicle, a compartment suspended between the traction wheels and adapted to project down into the chute between the traction rails and side rollers adapted to engage side guard rails when the car swerves to one side and having brackets which project underneath the inner edges of the traction rails, said downwardly projecting compartment being slightly tapered in the downward direction.

7. A passenger coaster car for pleasure coasters including a pair of side members and a cross seat member forming therewith the main body frame, a boxlike structure suspended from beneath the main frame, bridging the side members and extending forward of the seat, traction wheel brackets carried underneath the side members with shafts extending transversely through the box structure, a housing surrounding the seat, and a bumper structure carried on the front end of the car, said main body frame members and the suspended box member being formed into a rigid structure by integral angle pieces firmly fastened thereto and therebetween.

8. A passenger coaster car including a main frame, a pair of side boards on opposite sides thereof upon which a lap rail is adapted to slide, a guide rail disposed on the outer upper edge of each side board and flush therewith, a lap rail bridging said side boards and overhanging the guide rails and a pair of U shaped retaining members fastened to and carried on the opposite ends of said lap rail with one leg of the U projecting underneath the corresponding guide rail.

9. A passenger coaster car including a main body, a seat and passenger compartment therein, a pair of side members leading from the seat toward the front end of the car and a lap rail bridging said side members and slidable rearwardly and forwardly upon the upper surfaces thereof, said lap rail including on each end a part which extends outwardly, downwardly and underneath a portion of the corresponding side member for retaining the same in an operative position.

10. A passenger coaster car for pleasure coasters including a main base frame, one member of which forms the seat for the passenger compartment, a pair of traction wheels disposed underneath the opposite ends of said seat member and journaled with their peripheries just clearing said seat member, a forward pair of traction wheels disposed underneath other members of the main base frame, a downward extension of the passenger compartment disposed intermediate the traction wheels and having the greater portion thereof disposed below the axis of traction of said wheels whereby the center of gravity of the loaded car is approximately opposite the traction axis, and an upwardly extending enclosing casing surrounding the rear and sides of said seat member.

In testimony whereof, I have signed my name to this specification.

FRANK W. DARLING.